April 15, 1958     J. G. HAWLEY     2,830,680
AUTOMATIC BRAKE ADJUSTOR FOR BRAKE LINING WEAR
Filed June 17, 1955
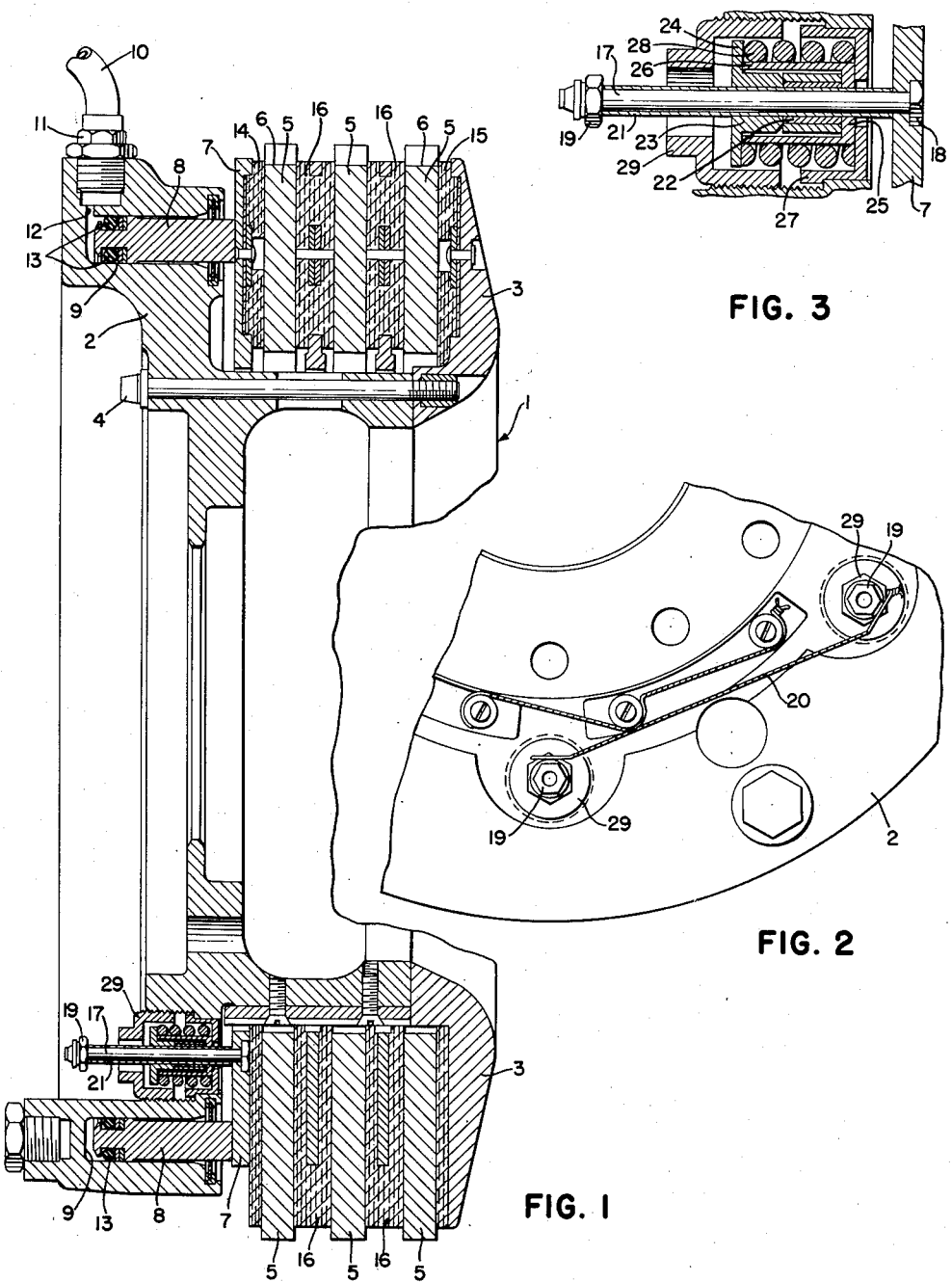
INVENTOR.
JESSE G. HAWLEY
BY
R. L. Miller
ATTORNEY United States Patent Office 2,830,680
Patented Apr. 15, 1958

2,830,680

AUTOMATIC BRAKE ADJUSTOR FOR BRAKE LINING WEAR

Jesse G. Hawley, Penn Yan, N. Y., assignor to The Goodyear Tire & Rubber Company, Akron, Ohio Application June 17, 1955, Serial No. 516,148

4 Claims. (Cl. 188—72)

This invention relates to automatic brake adjustors, and especially to improvements in automatic brake adjustors provided in braking means for automatically compensating for wear on brake linings.

This invention relates to brakes and particularly to the automatic adjustment pin or means provided in brakes of the general type disclosed in and covered by C. E. Bricker, Patent No. 2,392,970, which discloses one type of an automatic adjustment pin for controlling the positioning of brake lining means in a brake and permitting automatic compensation in the brake as the brake lining means are worn away in use.

One problem that arises in brakes having automatic brake adjustor means present therein is that when the brake linings become worn and are replaced with new brake linings, the positions of the automatic adjustment pins must be changed in view of the thick, new brake linings in the brake. Also, the disassembly of the brake is complicated when one must always remove the adjustment pin in making any brake repair. These automatic adjustment pins may comprise a pin substantially fixedly positioned in the brake by some type of friction means that allows movement of the adjustment pin along its axis as wear occurs. It is very difficult to force these adjustment pins backwardly through the friction motion retarding means provided therefor, nor is it easy to otherwise remove the adjustment pins so that the servicing of the brakes having the adjustment pins therein becomes a more complicated operation than in types of brakes not having such automatic adjustment pins present therein.

The general object of the present invention is to provide a new and improved type of an automatic brake adjustor for use in brakes of the class described and wherein the adjustor is characterized by its ready removability from the remainder of the brake assembly.

Another object of the invention is to provide a tubular member in an automatic brake adjustment structure, which tubular member is positioned on a support core that can be removed from the brake assembly to facilitate brake relining and servicing operations.

A further object of the invention is to provide a removable sub-assembly for automatic adjustment of the brake release position as brake lining wear occurs.

Another object of the invention is to permit pre-assembly of an automatic adjustment device to insure proper operation thereof.

The foregoing and other objects and advantages of the invention will be made more apparent as the specification proceeds.

Attention now is directed to the accompanying drawings wherein one currently preferred embodiment of the invention is shown and wherein:

Fig. 1 is a vertical section of a brake embodying the principles of the invention;

Fig. 2 is a fragmentary elevation of the brake of Fig. 1; and

Fig. 3 is an enlarged detail section of the automatic adjustment means of the invention.

When referring to corresponding parts shown in the drawings and referred to in the specification, corresponding numerals are used to facilitate comparison between such equivalent parts.

The present invention in general relates to a brake including a brake lining carrying member, piston and cylinder means for actuating and controlling said member, and an adjusting pin assembly for limiting the movement of the brake lining carrying member removably connected thereto; the adjusting pin assembly including adjusting pin means, friction means carried on and tightly engaging the adjusting pin and resisting relative longitudinal movement therebetween, and housing and spring means for engaging the friction means and securing the adjusting pin assembly in the brake to permit relative movement of the adjusting pin and friction means by continued movement of said brake lining carrying member so that adjustment of the inoperative positioning of the brake when released is provided as brake lining wear occurs.

The brake of the invention is indicated as a whole by the numeral 1 and the drawings show the details of such brake. This brake 1 includes a suitable brake housing 2 having a separate end member 3 suitably secured thereto as by bolts 4 to define a peripheral opening in the brake housing in which a plurality of brake discs 5 are received for limited movement along the axis of the brake housing. These brake discs 5 are adapted to be engaged and carried by a suitable wheel (not shown) by engagement with splines 6 in the periphery of the brake discs. An annular brake pressure plate, or brake lining positioning member 7 is provided in the brake and has an annular control piston 8 secured thereto and extending therefrom.

The annular control piston 8 is received in a chamber 9 shaped complementary thereto in which the control piston 8 is snugly received for sliding action therein. Actual braking action is produced by a conventional control member (not shown), such as a brake pedal or arm operated by the pilot of the aircraft with which the brake 1 of the invention is associated, or by the operator of the apparatus on which the housing 2 is positioned. Such actuation of a brake pedal or other member will cause hydraulic pressure to be set up in a conventional hydraulic system connected thereto, which pressure is transmitted to the brake 1 by means of a conduit 10 secured to the brake housing by a fitting 11. The hydraulic pressure fluid flows through a port 12 to the chamber 9 to set up braking movement on the annular control piston 8. Conventional O-ring gaskets 13 are provided for sealing the control piston in the chamber 9.

A brake lining 14 is secured to the brake pressure plate 7 and moves therewith, whereas a similar brake lining 15 is secured to the housing member 3. Other brake lining and carrier means 16 are non-rotatably positioned intermediate adjacent faces of the brake discs 5. Thus the introduction of hydraulic fluid under pressure to the chamber 9 will cause axial movement of the control piston 8 along the brake 1 and force the brake lining means and brake discs into tight braking engagement with each other to produce the desired brake action on the wheel to which the brake discs 5 are secured.

As an important element of the present invention, an automatic adjustment device or assembly is provided for use with the brake 1 and such means include an automatic adjustment pin 17 secured to and movable with the brake pressure plate pivot. In this instance, such automatic adjustment pin 17 comprises a conventional bolt, the head 18 of which is seated in a complementary shape recess provided in one face of the brake pressure plate. The automatic adjustment pin 17 has a nut 19 on one end thereof and the nut may be retained in position by a lock wire 20, or other conventional lock means.

Another special feature of the automatic adjustment pin 17 is that a sleeve or tube 21 is carried thereby and held thereon snugly against any relative longitudinal movement thereto by abutting one end of the sleeve 21 against the brake pressure plate 7 and the other end against the nut 19. The actual friction means for engaging the automatic adjustment pin 17 actually engage the sleeve 21, and comprise friction or grip means 22 that tightly engages the periphery of the sleeve 21. A spacer sleeve 23 bears against the axial outer end of such friction means, and has a drive or other tight fit on the sleeve 21 to form a unit therewith. Spacer sleeve 23 has a flange 24 extending therefrom at its axially outer end, and the friction means 22 contact or seat against a radially inwardly extending flange 25 provided on a positioning or locating sleeve 26 for its retarding action. The axially inner end of the locating sleeve 26 bears on a removable cup shaped member 27 that seats on the brake housing 2 and operatively forms a unit therewith. The locating sleeve 26 encompasses the friction means 22. In use, the sleeve 21 and adjustment pin 17 move as a unit with the brake pressure plate 7 so that as brake lining wear occurs, such brake pressure plate, or brake lining carrying member will be moved farther and farther axially of the brake 1 towards the end member 3 of the brake. As such wear occurs, the friction means 22 will be moved against the cup shaped member 27 to abut thereon and be held in position while the automatic adjustment pin moves inwardly of the brake and effects an adjustment in the positioning of the brake means both when operative and when released.

In order to provide the desired clearance in the brake upon release of the braking forces, a conventional coil spring 28 is carried by the locating sleeve 26 and has one end abutting against the cup shaped member 27. The opposite end of the spring 28 seats against the flange 24 of the spacer sleeve 23 so that upon release of the hydraulic braking forces, such spring 28, having been compressed during the braking movement of the automatic adjustment pin 17 and associated means, moves the automatic adjustment pin 17 and the brake pressure plate 7 axially outwardly of the brake slightly to provide the required operating clearance.

A conventional cover 29 is engaged with the brake housing 2 and is shown in somewhat exaggerated axial clearance relationship to the flange 24 of the spacer sleeve. In all events, the spring 28 urges the spacer sleeve 23 and associated means axially outwardly of the brake 1 until the flange strikes the inner surface of the cover 29, when the brake is released.

When relining or servicing the brake of the invention, the nut 19 is removed from the automatic adjustment pin 17 so that it can be removed from the brake readily and the relationship between the sleeve 21 and friction means 22 is not effected in any manner by removal of the automatic adjustment pin means or its carrier support from the apparatus. Likewise, the sleeve 21 and associated means are readily repositioned in the apparatus as the automatic adjustment pin may easily be reassembled in and secured to the sleeve 21 and no further assembly or adjustment of the adjustment pin is required.

It also will be noticed that the friction means 22, spacer sleeve 23 and other associated parts can be positioned on the sleeve 21 prior to engagement of such sleeve by the automatic adjustment pin 17, and the sub-assembly can be tested to be sure that it is assembled properly and that it operates in a satisfactory manner.

In view of the foregoing, it will be seen that the objects of the invention have been achieved as a novel type of an automatic adjustment pin has been provided in the brake and the servicing and assembly thereof has been facilitated and simplified.

While one complete embodiment of the invention has been disclosed herein, it will be appreciated that modification of this particular embodiment of the invention may be resorted to without departing from the scope of the invention as defined in the appended claims.

What is claimed is:

1. In a disc type brake, an annular brake lining positioning member, annular piston means and annular cylinder means operatively associated with said brake lining positioning member for controlling braking action thereof, an adjustment pin secured to and extending axially from said brake lining positioning member at a position offset radially from said piston and cylinder, a sleeve snugly fitting around said adjustment pin, means removably securing said sleeve to said adjustment pin in a manner to prevent any relative longitudinal movement therebetween during operation of the brake but to permit removal of the brake positioning member and the pin without disturbing the sleeve when the brake lining is to be renewed, friction means tightly engaging said sleeve to restrain longitudinal movement thereof, and means engaging said adjustment pin to provide operating clearance in the brake when released.

2. In a disc type brake, an annular brake lining positioning member, annular piston means and annular cylinder means operatively associated with said brake lining positioning member for controlling braking action thereof, an adjustment pin secured to and extending axially from said brake lining positioning member at a position radially inward of said piston and cylinder, a sleeve on said adjustment pin, means securing said sleeve and said adjustment pin together in a manner to prevent any relative longitudinal movement therebetween during operation of the brake but to permit removal of the brake positioning member and the pin without disturbing the sleeve when the brake lining is to be renewed, and means fixed to said cylinder means tightly engaging said sleeve to restrain longitudinal movement thereof.

3. In a disc type brake, an annular brake lining carrying member, means for actuating said brake lining carrying member, an adjusting pin for limiting the movement of said brake lining carrying member connected thereto at a position offset from said actuating means, a sleeve on said adjusting pin and based against said brake lining carrying member, removable means immovably securing said sleeve to said adjusting pin, and means associated with said actuating means for engaging said sleeve to retard movement of said adjusting pin, said brake lining carrying member and said adjustment pin being removable axially of the brake upon removal of said removable securing means without disturbing the movement retarding means or said sleeve.

4. In a disc type brake having an annular brake pressure plate for setting up braking pressure, an automatic adjustment pin removably secured to the brake pressure plate, sleeve means forming a unit with, but removably secured to said automatic adjustment pin, means engaging said sleeve means to retard axial movement thereof but permit such movement when a predetermined pressure is exceeded, and means engaging the end of the pin to secure it to said sleeve means during operation of the brake but to permit removal of the adjusting pin when the brake lining is to be renewed without disturbing the sleeve or its retarding means.

References Cited in the file of this patent

UNITED STATES PATENTS

| | | |
|---|---|---|
| 2,551,251 | Du Bois | May 1, 1951 |
| 2,584,191 | Danly et al. | Feb. 5, 1952 |
| 2,619,198 | Freund | Nov. 25, 1952 |